(12) United States Patent
Schuster

(10) Patent No.: US 9,874,729 B2
(45) Date of Patent: Jan. 23, 2018

(54) COMPACT ACHROMATIC AND PASSIVE OPTICALLY-ONLY ATHERMALIZED TELEPHOTO LENS

(71) Applicant: Umicore, Brussels (BE)

(72) Inventor: Norbert Schuster, Olen (BE)

(73) Assignee: Umicore, Brussels (BE)

( * ) Notice: Subject to any disclaimer, the term of this patent is extended or adjusted under 35 U.S.C. 154(b) by 0 days.

(21) Appl. No.: 14/900,728

(22) PCT Filed: Jun. 27, 2014

(86) PCT No.: PCT/EP2014/063716
§ 371 (c)(1),
(2) Date: Dec. 22, 2015

(87) PCT Pub. No.: WO2014/207209
PCT Pub. Date: Dec. 31, 2014

(65) Prior Publication Data
US 2016/0131876 A1    May 12, 2016

(30) Foreign Application Priority Data

Jun. 27, 2013 (EP) .................................... 13174061

(51) Int. Cl.
*G02B 13/02* (2006.01)
*G02B 13/14* (2006.01)
(Continued)

(52) U.S. Cl.
CPC ........... *G02B 13/14* (2013.01); *G02B 5/1814* (2013.01); *G02B 13/02* (2013.01); *G02B 27/0025* (2013.01); *G02B 27/0037* (2013.01)

(58) Field of Classification Search
CPC ...... G02B 13/14; G02B 5/1814; G02B 13/02; G02B 27/0037; G02B 27/0025;
(Continued)

(56) References Cited

U.S. PATENT DOCUMENTS

| 5,504,628 A | 4/1996 | Borchard |
| 5,737,120 A | 4/1998 | Arriola |
| 2009/0052018 A1* | 2/2009 | Baker ................. G02B 9/04 359/356 |

FOREIGN PATENT DOCUMENTS

| JP | 2001188166 | 7/2001 |
| WO | WO2013098180 | 7/2013 |

OTHER PUBLICATIONS

Naitoh, M., et al., "The radiation tolerance of chalcogenide glasses", Proc. SPIE, vol. 7660 (2010), pp. 766028-1 to 766028-11.*
(Continued)

*Primary Examiner* — Stephone B Allen
*Assistant Examiner* — Rahman Abdur
(74) *Attorney, Agent, or Firm* — Brinks Gilson & Lione

(57) ABSTRACT

The disclosure relates to infrared achromatic and athermalized narrow-field arrangements without any mechanical compensation mechanism realized by a single convergent front lens and a single divergent correcting lens. The long back focal length allows for cooled and uncooled detectors, different detector sizes, wavebands, and housing materials. A high resolution is achieved with fast f-numbers below f/2.0.

5 Claims, 2 Drawing Sheets

Figure 1:
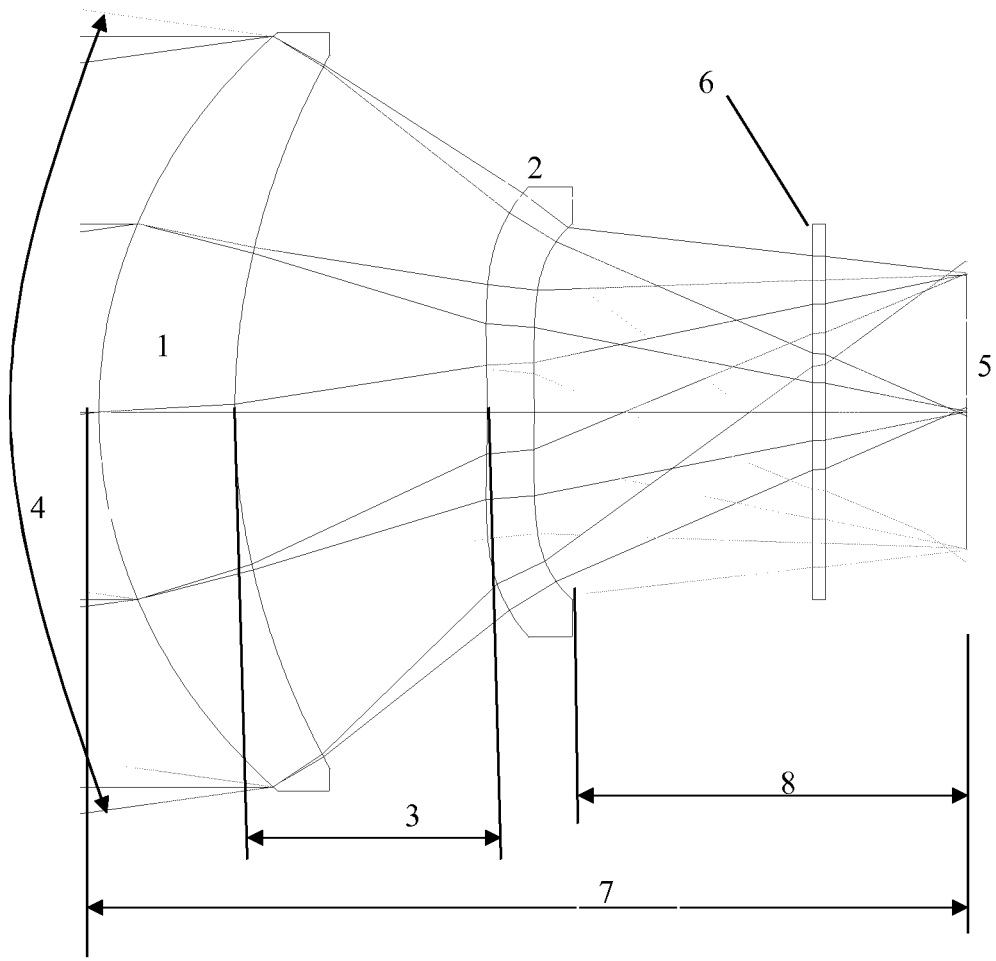

(51) Int. Cl.
*G02B 27/00* (2006.01)
*G02B 5/18* (2006.01)

(58) Field of Classification Search
CPC . G02B 1/00; G02B 1/041; G02B 9/00; G02B 9/04; G02B 9/10; G02B 9/12; G02B 9/14; G02B 9/16; G02B 13/008; G02B 13/146
USPC ............... 359/356; 356/717, 795, 716, 785, 356/350–361, 792, 709
See application file for complete search history.

(56) References Cited

OTHER PUBLICATIONS

Niaitoh, M., et al., "The radiation tolerance of chalcogenide glasses", Proc. SPIE, vol. 7660 (2010), pp. 766028-1 to 766028-11.
International search report for PCT/EP2014/063716, dated Jul. 30, 2014.

* cited by examiner

COMPACT ACHROMATIC AND PASSIVE OPTICALLY-ONLY ATHERMALIZED TELEPHOTO LENS

This application is a National Stage application of International Application No. PCT/EP2014/063716, filed Jun. 27, 2014. This application also claims priority under 35 U.S.C. §119 to European Application No. 13174061.5, filed Jun. 27, 2013.

This disclosure relates to large aperture achromatic and athermalized lens arrangements for infrared imaging with a narrow field of view. Well engineered narrow-field lenses warrant sharp and high-contrast images of even distant scenes. Most critical parameters of this type of lenses are volume and weight, wavelength drift, and thermal drift.

New detector developments having a 17 or even 12 μm pixel pitch require lens assemblies with steadily increasing higher spatial resolutions. The resolution limit by diffraction can be circumvented by relatively large aperture lens arrangements having an aperture-based f-number below f/1.5. Larger apertures have the additional advantage of increasing the thermal resolution of the camera, according to a square law. Smaller apertures down to f/2.0 can nevertheless be envisaged without being too detrimental.

The traditional arrangement in two convergent groups ("Petzval"—lens) leads to an overall length (OL) longer than effective focal length (EFL) and to a short back focal length (BFL). The first fact limits the portability or mobility. The second restricts the mechanical fit to the camera. The latter becomes very critical for cooled detectors, typically needing room for a Dewar and a cold stop near the detector plane.

An example is given in "The radiation tolerance of chalcogenide glasses", Masataka Naitoh et al., Proc. SPIE (2010), Vol. 7660, 7660028, where an athermal infrared lens assembly is described. Both chromatic aberrations and thermal defocusing are said to be compensated for. The design uses a convergent front group consisting of 2 lenses, one made of chalcogenide glass, the other of germanium. This latter lens is moreover diffractive. The back group is slightly convergent and consists of 3 germanium lenses. A focal length of 78 mm is reported for an overall length of 102 mm. This arrangement is thus not particularly compact, and expensive due to the large number of lenses. The optical design is not detailed, the lens profiles remaining unspecified.

The only way to reduce the volume at given f-number and EFL is to minimize OL. For that, convergent front groups can be combined with a divergent back group. These arrangements, also called telephoto, have very often three lenses or more, with f-numbers above f/1.7.

Advanced optimization techniques along with expert insight may moreover offer solutions using only two lenses: key to this concept are a convergent front lens with a small thermo-optical constant (TOC or $\gamma_T$) and a divergent image-side lens with a high TOC. Preferred materials for the front lens are chalcogenide glasses; a suitable material for the image-side lens is germanium.

Such modern two lens designs in a telephoto arrangement and having lower f-numbers typically achieve passive athermalization by a combination of optical and mechanical compensation mechanisms. State of the art is the passive mechanical athermalization using materials with widely different thermal expansion coefficients within the holder, such as plastic tubes or rings placed within a metallic holder. The differential expansion induces slight readjustments of the geometry by shifting the relative position of the lenses as a function of the temperature. The lens holder however is mechanically complex and is thus somewhat fragile.

Unpublished international application PCT/EP2012/076332 teaches such a modern 2-lens arrangement combining mechanical and optical thermal corrections. The detailed designs offer high optical performances, compatible with the use of current fine-pitch detectors. A plastic thermal expansion ring is used in each of the exemplified designs.

The aim of the present disclosure is to achieve passive athermalization by optical means only, thus without any relative correcting movements of the lenses in the lens holder. As a result, a simple, sturdy monolithic lens holder is rendered possible. In this case, the shape of back lens is more like a correction plate with a negative optical power and is therefore further referred to as a divergent correcting lens.

To this end, a novel optical design has been developed, in particular an infrared achromatic and athermalized telephoto lens arrangement consisting of a single convergent front lens having a TOC below $35 \times 10^{-6}$ K$^{-1}$ and of a single divergent correcting lens having a TOC above $75 \times 10^{-6}$ K$^{-1}$, having an aperture-based f-number lower than f/1.5, characterized in that:

$$0.91 \leq OL/EFL \leq 1.01;$$

$$0.32 \leq BFL/EFL \leq 0.50;$$

$$0.20 \leq VD/EFL \leq 0.48;$$

the temperature compensation is obtained by passive optical compensation only; and, the optical power of the correcting lens varies from an on axis first value to a maximal image height second value, the ratio of the second to the first value being 1.05 to 1.40.

The optical power of the divergent correcting lens thus increases, from the on axis value to the maximal image height value, by 5 to 40%.

It should be noted that EFL is the effective focal length of the lens assembly, OL is its overall length, BFL is its back focal length, and VD is the vertex distance between both lenses. The athermalization is achieved across a temperature range of −40 to +80° C. An on-axis resolution corresponding to an averaged MTF at 29 cy/mm of better than 0.300 is achieved over the full temperature range.

By TOC is meant the thermo-optical constant of the lens material, also known as $\gamma_T$. By aperture-based f-numbers lower than f/1.5 are meant larger aperture sizes, such as e.g. f/1.2.

Preferred embodiments include the above lens arrangement, characterized in that front lens material is a chalcogenide glass.

Germanium is advantageously chosen as the lens material of the divergent correcting lens. Thanks to its very high TOC of about $125 \times 10^{-6}$ K$^{-1}$, germanium is indeed most suitable for use in the correcting lens.

The convergent front lens is preferably realized by a convergent meniscus having one concave surface, said surface being directed towards the inside the housing.

Furthermore, a diffractive pattern can be provided on one of the lens surfaces.

The above optical designs are particularly suitable for narrow-field assemblies, i.e. adapted for a horizontal field of view (HFOV) of 20 degrees or less.

Under these circumstances, the lens housing becomes a monolithic tube with lenses located at fixed positions. This represents a big step ahead towards portable and rugged equipment. Nonetheless, a careful choice of lens and housing materials and of lens shapes remains mandatory to achieve the envisaged optical resolution and thermal drift.

The impact of lens housing material must be taken in account. Materials with a low thermal expansion coefficient such as metals or alloys are preferred, as a reduced optical power of front lens and correcting lens is made possible.

A diffractive pattern on one lens surface allows for a more effective compensation of chromatism, a useful feature as the bandwidth of the system may span atmospheric windows.

The design also provides for a large back focal length. In doing so, compatibility is ensured with different types of detectors, cooled and uncooled, of different sizes, and for different wavebands.

Further advantages are:
high spatial resolution on initial temperature at 29 cy/mm in whole field;
high spatial resolution over whole temperature range at 29 cy/mm;
adaptability to different detector pixel counts like 320× 240, 640×480 (VGA), 1024×768 (XGA);
adaptability to different pixel pitches like 25 µm, 17 µm, 15 µm, 12 µm;
adaptability to different wave bands like 3-5 µm, 8-12 µm, 7-14 µm;
adaptability to different housing materials.

Based on the above boundary conditions, in particular those concerning the graded optical power of the divergent correcting lens, successful realizations are within the realm of an optical designer having access to state of the art software.

Examples 1 to 6 illustrate the invention. Tables 1 to 4 provide all technical details. Example 3 is depicted in FIG. 1, while Examples 4 and 5 are depicted in FIG. 2.

Figure 2:
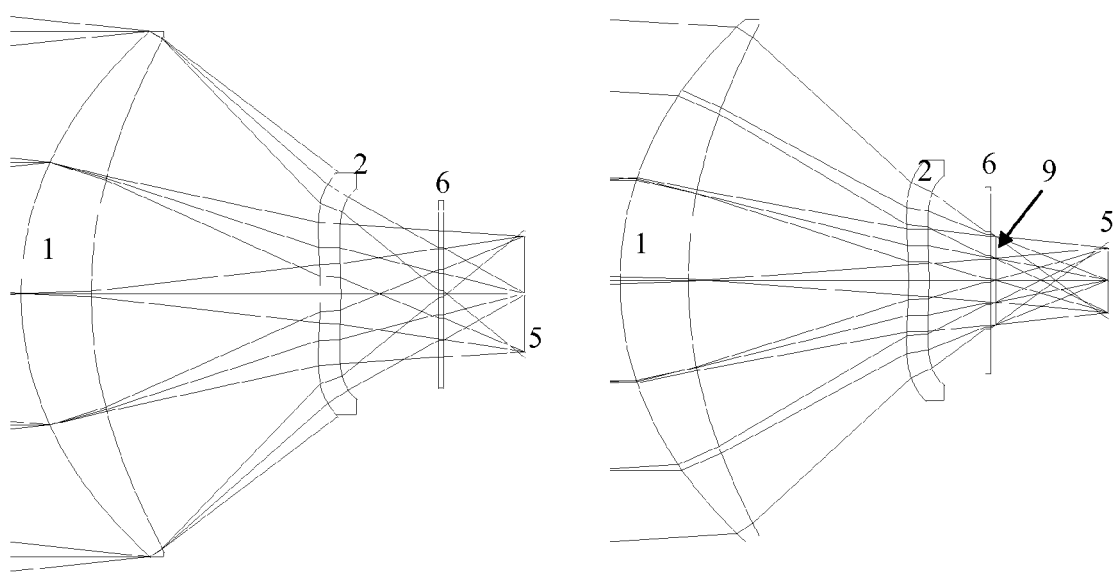

FIG. 1 corresponds to Example 3. Are shown: convergent front lens (1), divergent correcting lens (2), vertex distance (VD) (3), field of view angle (4), detector diagonal (5), detector window (6), overall length (OL) (7), and the free back focal length (BFL) (8).

It is an 8-12 µm-waveband-lens arrangement with the effective focal length EFL of 75 mm and an aperture based f-number f/1.25 optimized for a field of view of an uncooled XGA imaging device with 17 µm pixel pitch. In terms of classical 135 film photography, this lens arrangement corresponds to a 135 mm lens. It could also be easily combined with the smaller XGA 12 µm pixel pitch detector. The lens is achromatic and purely optically athermalized in a temperature range −40 to +80° C. No mechanical compensation mechanism is necessary to maintain the good resolution values shown in Table 2.

The presented solution comprises a convergent front lens and a divergent correcting lens. The surface curvature of both lenses varies with the image height, i.e. the distance from the optical axis.

The vertex distance is measured between convergent front lens and divergent correcting lens.

Both surfaces of divergent correcting lens change their sign of curvature at increasing heights: they are negative on axis, and they become positive at a certain height. This is not a necessary criterion: the curvature of both surfaces may also remain positive as shown in Example 6. Necessary is that the optical power of correcting lens remains always negative. Moreover, the negative power of the correcting lens always needs to increase slightly with the image height. This is reflected in Table 4, column "Optical power of divergent correcting lens (dioptre)".

The presented example focus objects inside the field angle on the detector plane. The length of the line (5) corresponds to the detector diagonal of 22 mm realized by an XGA imaging device with 17 µm pixel pitch. Therefore, the field of view angle shown here is the diagonal field of view of 16.0 degrees.

The detector is covered by the window. The resulting overall length is 70.5 mm. The free back focal length is 31.8 mm.

FIG. 2 (left) corresponds to Example 4 (uncooled detector) and FIG. 2 (right) to Example 5 (cooled detector). Are shown: convergent front lens (1), divergent correcting lens (2), detector diagonal (5), detector window (6), and the cold stop (CS) (9). All details are reported in Tables 1 to 4.

Both embodiments have an EFL of 100 mm and similar lens shapes. Both are achromatic and purely optically athermalized across the temperature range −40 to +80° C. Again, no mechanical compensation mechanism is necessary and the negative power of the correcting lens always needs to increase slightly with the image height.

Example 4 is intended to image on an uncooled XGA device with 17 µm pixel pitch. Resulting image diagonal is 22 mm. The achieved aperture based f-number is f/1.0.

Example 5 is designed to image on a modern cooled VGA device with 15 µm pixel pitch, equipped with a cold stop inside the Dewar of the detector assembly. The resulting image diagonal is 12.4 mm. The high BFL/EFL ratio of 0.31 allows increasing the distance from the detector plane to the cold stop. The cold stop limits the diameter of all ray bundles, on axis as well as off axis. The ray bundles to the outer detector pixels determine the minimal diameter of the convergent front lens. A high BFL/EFL ratio provides for more free room between divergent correcting lens and detector, allowing for positioning the cold stop as far as possible from the detector. Minimizing the distance between divergent correcting lens and cold stop is key in reaching an aperture-based f-number below f/1.5. This aperture is exceptionally large for a cooled imaging device with cold stop.

Possible lens materials for the convergent front lens are: GASIR®1 ($Ge_{22}As_{20}Se_{58}$), which has a refractive index of about 2.5, GASIR®3 ($Ge_{12}Sb_{13}Sn_7Se_{68}$) with a refractive index of about 2.6, and $As_2Se_3$-glass with a refractive index of about 2.8. The lens material for the divergent correcting lens may be germanium, which has a refractive index of about 4.0.

The geometric parameters in Tables 3 and 4 correspond to lens surfaces according to the formula:

$$z(r) = \frac{cr^2}{1+\sqrt{1-(1+k)c^2r^2}} + \alpha_4 r^4 + \alpha_6 r^6 + \alpha_8 r^8 + \alpha_{10} r^{10} + \alpha_{12} r^{12} + \alpha_{14} r^{14}$$

where $c=1/r_0$ with $r_0$ the vertex radius, r the distance from optical axis, and z the coordinate on the optical axis, $r_0$, r and z being expressed in mm.

The diffractive structures are presented by phase deformation in first diffractive order according to the formula:

$$\Phi = \sum_{i=1}^{N} A_{2i} \rho^{2i}$$

where $\rho=r/r_1$ with the normalization radius $r_1$ and the phase coefficients $A_{2i}$. The reference wavelength is the centre of the waveband.

TABLE 1

Basic data of achromatic and athermalized lens arrangements according to the invention, suitable for the waveband 8-12 μm

| Example | EFL (mm) | f-number | Detector pixels | pitch (μm) | type | HFOV (degree) | Housing material |
|---|---|---|---|---|---|---|---|
| 1 | 35 | f/1.30 | 640x512 | 17 | Uncooled | 17.3 | Brass |
| 2 | 50 | f/1.27 | 1024x768 | 12 | Uncooled | 13.5 | Aluminium |
| 3 | 75 | f/1.25 | 1024x768 | 17 | Uncooled | 13.0 | Steel |
| 4 | 100 | f/1.00 | 1024x768 | 17 | Uncooled | 9.8 | Brass |
| 5 | 100 | f/1.37 | 640x512 | 15 | Cooled ØCS 17 mm | 5.7 | Brass |
| 6 | 140 | f/1.30 | 1024x768 | 17 | Uncooled | 7.2 | Steel |

TABLE 2

First order parameters and image quality values of achromatic and athermalized lens arrangements according to the invention, suitable for the waveband 8-12 μm, including resolution values as averaged MTF at 29 cy/mm

| Example | BFL/EFL | OL/EFL | VD/EFL | On Axis MTF +20° C. | Corner MTF +20° C. | On Axis MTF −40° C. | On Axis MTF +80° C. |
|---|---|---|---|---|---|---|---|
| 1 | 0.49 | 0.98 | 0.27 | 0.483 | 0.292 | 0.463 | 0.432 |
| 2 | 0.49 | 0.93 | 0.23 | 0.466 | 0.319 | 0.437 | 0.435 |
| 3 | 0.46 | 0.94 | 0.27 | 0.441 | 0.264 | 0.400 | 0.413 |
| 4 | 0.33 | 0.97 | 0.48 | 0.533 | 0.285 | 0.329 | 0.345 |
| 5 | 0.34 | 0.96 | 0.42 | 0.496 | 0.449 | 0.426 | 0.438 |
| 6 | 0.49 | 1.00 | 0.34 | 0.521 | 0.437 | 0.492 | 0.504 |

TABLE 3

Detailed design parameters of convergent front lens (1) with diffractive structure on surface N° 2

| | Example | | | | | |
|---|---|---|---|---|---|---|
| | 1 | 2 | 3 | 4 | 5 | 6 |
| | Material | | | | | |
| | GASIR ®1 | GASIR ®3 | GASIR ®3 | $As_2Se_3$ | $As_2Se_3$ | $As_2Se_3$ |
| | Thickness (mm) | | | | | |
| | 4.9 | 7.2 | 10.8 | 13.2 | 13.2 | 16.5 |
| Surface N° 1 $r_0$ | 17.07 | 23.37 | 37.53 | 58.88 | 58.90 | 75.85 |
| k | −0.808 | −8.20E−01 | −8.71E−01 | −8.09E−01 | −8.05E−01 | −7.62E−01 |
| $\alpha_4$ | 1.39E−05 | 3.03E−06 | 1.02E−06 | 2.77E−07 | 2.81E−07 | 5.62E−08 |
| $\alpha_6$ | 1.54E−07 | 3.23E−09 | 6.23E−10 | 4.97E−11 | 4.08E−11 | 1.97E−11 |
| $\alpha_8$ | 5.48E−11 | 0 | 0 | 0 | 0 | 0 |
| $\alpha_{10}$ | −4.65E−12 | 8.73E−14 | 1.28E−15 | 9.33E−19 | 2.63E−18 | 1.78E−18 |
| $\alpha_{12}$ | 6.04E−14 | 0 | 0 | 0 | 0 | 0 |
| $\alpha_{14}$ | −2.10E−16 | −4.7E−19 | −8.8E−22 | −6.4E−25 | −7.5E−25 | −3.9E−25 |
| Surface N° 2 $r_0$ | 25.48 | 32.43 | 53.41 | 83.15 | 83.24 | 97.75 |
| k | 0 | 0 | 0 | 0 | 0 | 0 |
| $\alpha_4$ | −4.62E−06 | −1.17E−05 | −1.94E−06 | −3.15E−07 | −3.2E−07 | −2.5E−07 |
| $\alpha_6$ | 1.88E−07 | 0 | 0 | 0 | 0 | 0 |
| $\alpha_8$ | 1.29E−09 | 1.40E−10 | 4.83E−12 | 5.85E−16 | 3.08E−16 | 3.76E−14 |
| $\alpha_{10}$ | −1.53E−11 | −3.28E−13 | −4.29E−15 | −6.1E−18 | −5E−18 | −1.5E−17 |
| $\alpha_{12}$ | 2.25E−14 | 0 | 0 | 0 | 0 | 0 |
| Diffractive $r_1$ | 0.700 | 1.00 | 1.50 | 1.50 | 1.50 | 2.80 |
| $A_2$ | −0.155 | −0.292 | −0.418 | −0.179 | −0.179 | −0.39 |
| $A_4$ | 2.66E−04 | 1.03E−04 | 2.52E−04 | 2.02E−05 | 2.02E−05 | −7.03E−05 |
| $A_6$ | −5.30E−06 | −1.57E−07 | −4.75E−07 | −7.85E−09 | −7.85E−09 | 2.20E−07 |
| $A_8$ | 2.52E−08 | 0 | 0 | 0 | 0 | 0 |
| $A_{10}$ | −3.72E−11 | 0 | 0 | 0 | 0 | 0 |
| Air gap to divergent lens (mm) | 9.57 | 11.4 | 20.1 | 43.1 | 42.7 | 47.1 |

TABLE 4

Detailed design parameters of divergent correcting lens including optical power across the field of view

| | Example | | | | | |
|---|---|---|---|---|---|---|
| | 1 | 2 | 3 | 4 | 5 | 6 |
| | Material | | | | | |
| | Ge | Ge | Ge | Ge | Ge | Ge |
| | Thickness (mm) | | | | | |
| | 1.75 | 2.5 | 3.75 | 3.9 | 3.9 | 5.5 |
| Surface N° 3 $r_0$ | −20.03 | −88.74 | −141.64 | −95.39 | −95.57 | 520.61 |
| k | 0 | 0 | 0 | 0 | 0 | 0 |
| $\alpha_4$ | 4.67E−04 | 1.41E−04 | 4.02E−05 | 1.78E−05 | 1.79E−05 | 3.87E−06 |
| $\alpha_6$ | 3.52E−06 | 0 | 0 | 0 | 0 | 0 |
| $\alpha_8$ | −1.32E−07 | 8.91E−10 | 3.56E−11 | 1.42E−11 | 1.38E−11 | 1.2E−12 |
| $\alpha_{10}$ | 1.33E−09 | 0 | 0 | 0 | 0 | 0 |
| $\alpha_{12}$ | −3.99E−12 | −5.5E−15 | −1.3E−16 | −1.1E−17 | −2.4E−18 | −1.1E−19 |
| Surface N° 4 $r_0$ | −24.71 | −209.49 | −310.60 | −118.45 | −118.54 | 396.20 |
| k | 0 | 0 | 0 | 0 | 0 | 0 |
| $\alpha_4$ | 4.48E−04 | 1.67E−04 | 4.66E−05 | 1.91E−05 | 1.9E−05 | 4.7E−06 |
| $\alpha_6$ | 3.66E−07 | 0 | 0 | 0 | 0 | 0 |
| $\alpha_8$ | 1.56E−07 | 6.57E−09 | 3.70E−10 | 4.2E−11 | 4.81E−11 | 2.83E−12 |
| $\alpha_{10}$ | −5.14E−09 | 0 | 0 | 0 | 0 | 0 |
| $\alpha_{12}$ | 5.05E−11 | 3.08E−13 | 8.07E−16 | 1.26E−16 | 8.08E−17 | 1.01E−18 |
| | Optical power of divergent correcting lens (dioptre) | | | | | |
| On axis | −19.3 | −18.1 | −10.6 | −5.05 | −5.01 | −1.58 |
| 70% of diagonal field | −23.5 | −20.4 | −12.1 | −5.76 | −5.25 | −1.79 |
| 100% of diagonal field | −24.6 | −23.0 | −13.6 | −6.53 | −5.42 | −2.01 |

The invention claimed is:

1. An infrared achromatic and athermalized telephoto lens arrangement comprising a single convergent front lens having a Thermo-Optic Constant below $35 \times 10^{-6}$ K$^{-1}$ and a single divergent correcting lens having a Thermo-Optic Constant above $75 \times 10^{-6}$ K$^{-1}$, having an aperture-based lower than f/2.0, wherein:

$$0.91 \leq OL/EFL \leq 1.01;$$

$$0.32 \leq BFL/EFL \leq 0.50;$$

$$0.20 \leq VD/EFL \leq 0.48;$$

wherein OL is the Overall Length; EFL is Effective Focal Length; BFL is the Back Focal Length; and VD is the Vertex Distance, wherein the temperature compensation is obtained by passive optical compensation only; and, wherein the optical power of the correcting lens has a first value for on-axis rays, and a second value for rays focusing at maximum image height, the ratio of the second value to the first value being 1.05 to 1.40.

2. The lens arrangement according to claim 1, wherein the front lens material comprises chalcogenide glass.

3. The lens arrangement according to claim 1, wherein back lens material comprises Germanium.

4. The lens arrangement according to claim 1, where the convergent front lens is realized by a convergent meniscus having one concave surface, said surface being directed towards the inside of the housing.

5. The lens arrangement according to claim 1, where one lens surface is diffractive.

* * * * *